United States Patent
Reinhold

(10) Patent No.: US 11,779,433 B2
(45) Date of Patent: Oct. 10, 2023

(54) DEVICE FOR EXPOSING AN IMPLANT BASE BODY

(71) Applicant: Perfect Teeth Dental p.l.l.c, Rego Park, NY (US)

(72) Inventor: Martin Reinhold, Bremen (DE)

(73) Assignees: Perfect Teeth Dental p.l.l.c., Rego Park, NY (US); Martin Reinhold, Breman (DE)

( * ) Notice: Subject to any disclaimer, the term of this patent is extended or adjusted under 35 U.S.C. 154(b) by 0 days.

(21) Appl. No.: 17/186,023

(22) Filed: Feb. 26, 2021

(65) Prior Publication Data

US 2021/0259802 A1    Aug. 26, 2021

(30) Foreign Application Priority Data

Feb. 26, 2020  (DE) .......................... 102020105083.6

(51) Int. Cl.
*A61C 1/08* (2006.01)
*A61C 19/04* (2006.01)

(52) U.S. Cl.
CPC .............. *A61C 1/082* (2013.01); *A61C 19/04* (2013.01)

(58) Field of Classification Search
CPC ......... A61C 1/082; A61C 19/04; A61C 1/084; A61C 8/00; A61B 17/32053; A61B 17/32; A61B 2018/1452; A61B 5/1455; A61B 5/06; A61B 46/10
See application file for complete search history.

(56) References Cited

U.S. PATENT DOCUMENTS

| | | | | |
|---|---|---|---|---|
| 4,787,848 A * | 11/1988 | Ross | ........................ | A61C 8/00 433/165 |
| 4,880,381 A * | 11/1989 | Nieusma, Jr. | ............ | A61C 1/16 433/116 |
| 5,649,546 A * | 7/1997 | Steinbeck | ................ | A61B 5/06 600/550 |
| 10,383,639 B2 * | 8/2019 | Hwang | ................ | A61B 17/162 |
| 2003/0022132 A1 | 1/2003 | Jesch | | |
| 2005/0265522 A1 * | 12/2005 | Manley | .................. | G03B 42/02 378/169 |

(Continued)

FOREIGN PATENT DOCUMENTS

| | | |
|---|---|---|
| DE | 202007007072 U1 | 9/2007 |
| EP | 0485805 B1 | 12/1995 |

(Continued)

OTHER PUBLICATIONS

Atomo Dental Supplies, Syringe Sleeves (pre-punched opening) (500/box). Jun. 2015. https://www.atomodental.com/products/syringe-sleeve (Year: 2015).*

*Primary Examiner* — Heidi M Eide
*Assistant Examiner* — Lina Faraj
(74) *Attorney, Agent, or Firm* — Michael Soderman

(57) ABSTRACT

Device (1) for exposing an implant base body (2), in particular wherein the dental implant (2) is fixed in a person's jaw and is covered by gum. During exposure, the gum covering the implant base body is cut open to expose the implant base body, in particular it is removed in the shape of a hole circle. The device (1) comprises a sensor (22) for determining the position of the implant base body (91) covered by the gum (82), characterized in that the device (1) comprises a blade (32) for cutting the gum (82).

2 Claims, 2 Drawing Sheets

(56) References Cited

U.S. PATENT DOCUMENTS

| | | | | |
|---|---|---|---|---|
| 2008/0228072 | A1* | 9/2008 | Nycz | A61B 8/4455 |
| | | | | 600/407 |
| 2012/0148977 | A1* | 6/2012 | Shahak | A61C 19/04 |
| | | | | 433/215 |
| 2012/0225166 | A1* | 9/2012 | Hopps | B65D 51/24 |
| | | | | 426/106 |
| 2012/0265096 | A1* | 10/2012 | Mendez-Coll | A61B 17/0682 |
| | | | | 600/567 |
| 2014/0087326 | A1* | 3/2014 | Reifman | A61C 19/04 |
| | | | | 433/173 |

FOREIGN PATENT DOCUMENTS

| | | | | |
|---|---|---|---|---|
| EP | 1582174 | A2 * | 10/2005 | ........... A61C 8/0089 |
| EP | 1582174 | A2 | 10/2005 | |
| EP | 2781202 | A1 * | 9/2014 | ............. A61C 19/04 |
| EP | 2781202 | A1 | 9/2014 | |
| FR | 2686498 | A1 * | 7/1993 | ............. A61B 17/52 |
| KR | 20100082188 | A * | 7/2010 | |

\* cited by examiner

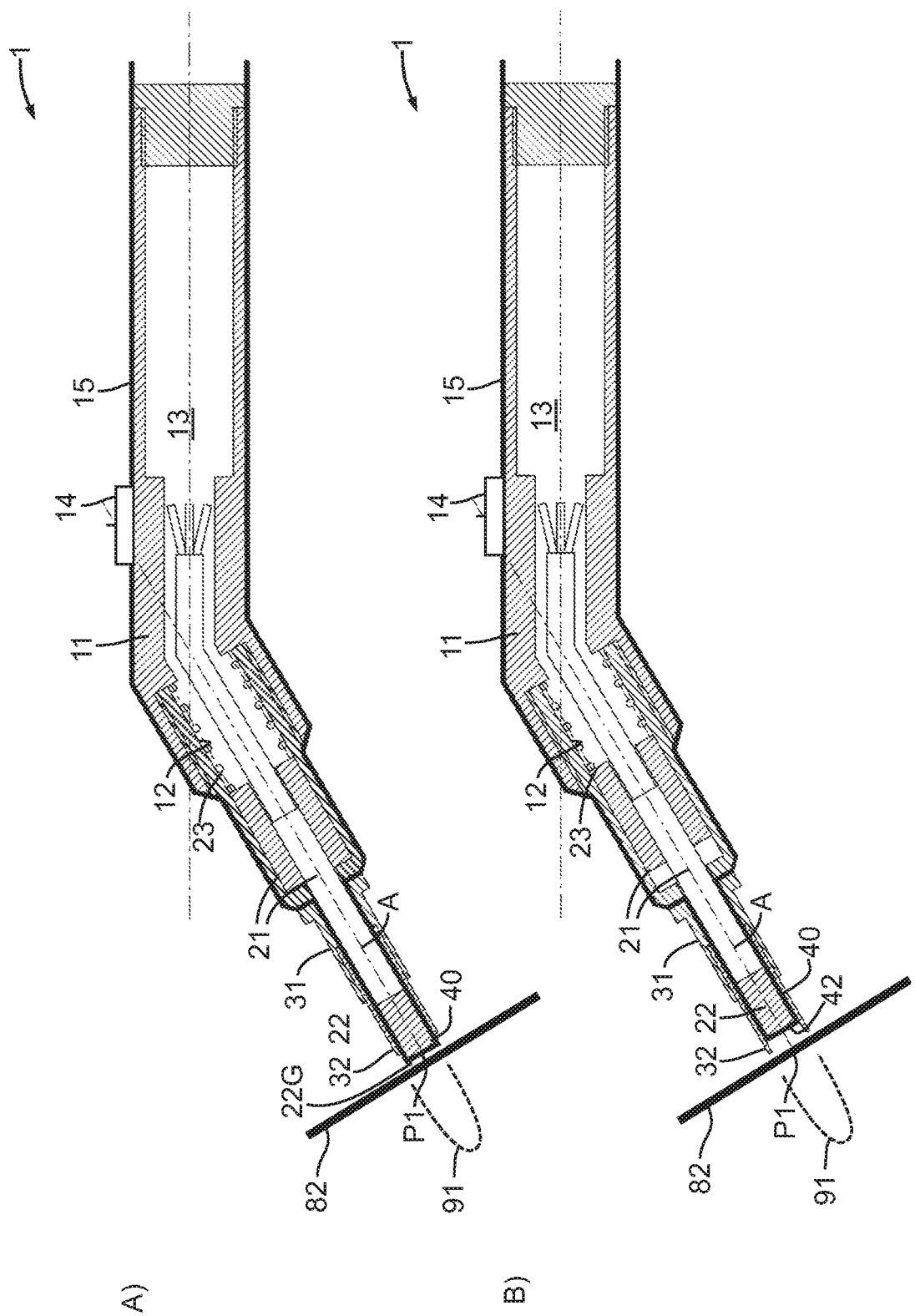

DEVICE FOR EXPOSING AN IMPLANT BASE BODY

CROSS REFERENCE TO RELATED APPLICATIONS

This application claims the priority of DE 102020105083.6 filed on 2020 Feb. 26; this application is incorporated by reference herein in its entirety.

BACKGROUND

The invention relates to a device for exposing an implant base body, in particular a dental implant.

FIG. 3 shows a dental implant 9 inserted in a jawbone 81. The dental implant 9 has several parts: an implant base body 91, an implant abutment 92 and a visible implant crown 93.

The implant base 91 is usually firmly inserted into the jawbone 81 in an ambulant procedure under local anesthesia. The jawbone is then allowed to heal for a few weeks without strain. The implant abutment 92 is then attached to the implant base 91. Finally, the implant crown 93 is attached to the implant abutment 92.

For healing, the implant base can include a temporary cover, in particular a healing cap. In the subsequent healing process, the implant base body (with cover, if necessary) is completely covered by the healing gingiva. To fix the implant abutment, the gum must be opened again to obtain access to the implant base body. Afterwards the cover can be removed and the implant abutment is connected to the implant base body instead.

To open the gum, a cutting blade is used to provide a cut in the gum just above the implant base. It is important to position the cut precisely.

US 2012/014 8977 A1 discloses a device for detecting the position of an implant base body under the gum. The gum can be provided with a mark at the detected position. Other devices are also described in EP 2 781 202 A1 and EP 0485 805 Bl.

EP 1 582 174 discloses a device for exposing the implant base body. A user can determine the position of the implant base body with the aid of a passive tip of the device. The insertion of the probe tip can easily injure the gums. Consequently the localization of the implant is already an invasive act on the gum. The user touches the gum surface with the aid of the tip. The user determines the position of the implant base body by means of haptic feedback. The feedback is comparatively inaccurate and requires multiple repetitions.

SUMMARY

Device (1) for exposing an implant base body (2), in particular wherein the dental implant (2) is fixed in a person's jaw and is covered by gum. During exposure, the gum covering the implant base body is cut open to expose the implant base body, in particular it is removed in the shape of a hole circle. The device (1) comprises a sensor (22) for determining the position of the implant base body (91) covered by the gum (82), characterized in that the device (1) comprises a blade (32) for cutting the gum (82).

DETAILED DESCRIPTION

It is the object of the present invention to provide an improved possibility for exposing an implant base body with minimal interventions in the tooth gum. This is solved by a device and a method according to the main claims; embodiments are the subject of the subclaims and the description.

In particular, the present invention is characterized by one or more of the following features:

With the device, the implant base body can not only be localized, but the gingiva can also be cut and removed directly after it has been found. Thus, changing the tool between detection and cutting is obsolete. The localization is non-invasive, so the impact on the gums is very low.

The positioning inaccuracy caused by an instrument change is avoided.

By cutting immediately after the position has been determined, uncovering can be completed more quickly.

The relative movability between the blade and the sensor makes it possible that on the one hand the blade does not interfere during the detection mode, on the other hand the blade is nevertheless optimally positioned for the cutting process. It also makes it possible that, on the one hand, the sensor does not interfere during the cutting mode, and on the other hand, the sensor is optimally positioned in the detection mode. Both the blade and the sensor are then optimally positioned when they are needed.

In principle, the sensor or the cutter can be fixed immovably to the base frame during use, while the other part in each case, namely the cutter or sensor, is mounted movably on the base frame for transfer from detection mode to cutting mode.

The device can be operated with only one hand. The other hand can be used for other tasks.

The blade and/or the sterility barrier can be designed as a sterile disposable part. Both the sterility barrier and the blade can be manufactured inexpensively or designs already available on the market can be used.

The fact that the sterility barrier covers the sensor during treatment prevents contact between the sensor and the gums. The open gums are not contaminated and the sensor does not have to be disinfected. This even makes it possible for several implant bases to be exposed directly one after the other in the same patient.

The spring is dimensioned so that sufficient pressure is built up to safely remove the gum. The pressure point can be optimized by dimensioning the spring (spring characteristic curve).

Between the handle and the blade and/or the sensor, the device has an angled shape. This allows access even to posterior jaw regions.

In particular, the sensor is set up to detect magnetic and/or electromagnetic properties of the environment. In an embodiment, the sensor may actively generate a magnetic field and/or an electric field. The generated field is modified by the implant base body. The modified field can in turn be detected by the sensor, from which the position of the implant base body is determined. In particular, the sensor is based on the measuring principle of inductive and/or capacitive distance measurement.

In particular, the sensor is set up to output a signal that can be used for information technology purposes and/or to determine the position of the implant base body for information technology purposes. In particular, the sensor is a magnetic field sensor.

BRIEF DESCRIPTION OF THE DRAWINGS

The invention is explained in more detail below with reference to the figures; herein shows:

FIG. 1 a device according to the invention in cross-section A) in a detection mode, B) in a cutting mode;

DETAILED DESCRIPTION OF THE PREFERRED EMBODIMENTS

Figure 3:
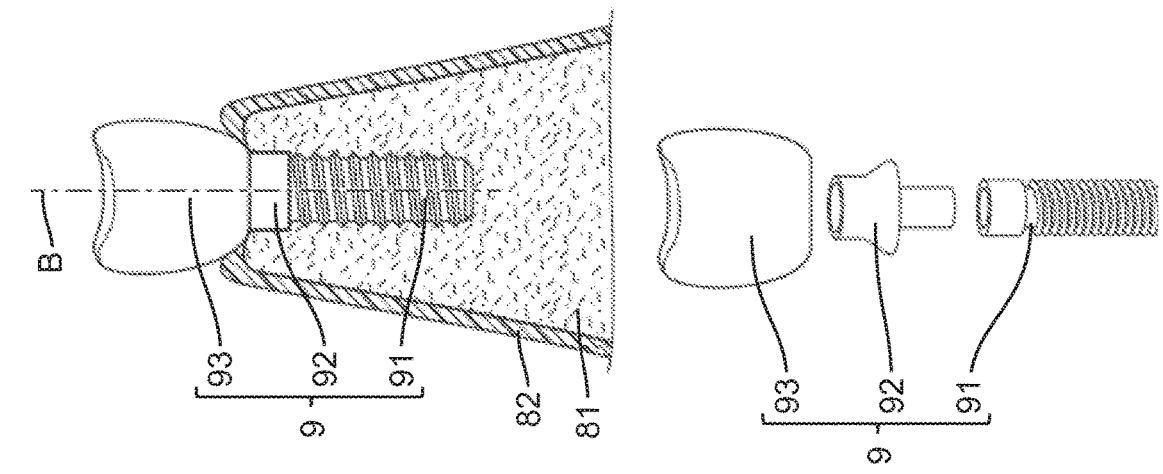
FIG. 3 a dental implant
A) inserted in a jaw bone in cross-sectional view,
B) in exploded view.

FIG. 1 shows a device 1 for exposing an implant base 91 of a dental implant 9.

The device 11 comprises a base frame 11 with a battery holder 13 in which a battery for the power supply is inserted. The device can be switched on via a switch 14. The base frame 11 includes a handle 15 for being held and guided thereby by an attending physician. The base frame 11 is may be formed from a plurality of individual parts.

The device 1 comprises a sensor 22 for detecting the position of the implant base body 91. The sensor 22 is held on the base frame 11 by means of a sensor holder 21. The sensor 22 can be moved along an axis A relative to the base frame 11. A sensor guide 12 is provided on the base frame 11, which holds the sensor holder 21 so that it can be moved in a defined manner relative to the base frame 11. The sensor 22 can be moved in a defined manner between an extended position (FIG. 1A) and a retracted position (FIG. 1B) along the axis A. In the detection mode and/or in the cutting mode, the axis A is in particular aligned with the axis B of the implant base body 91 when the position of the implant base body is detected by the sensor.

The device 1 comprises a blade 32 which, together with the blade holder 31, is pushed over the sensor 22 until it comes into contact with the base frame 11 or the sterility barrier 40. The blade forms a sterile unit with the blade holder 31, which is intended for single use. The blade is therefore firmly connected to the blade holder 31. This means that during intended use, the blade 32 cannot be detached from the blade holder 31.

The blade holder 31 is placed on the base frame 11 together with the blade 32 before use. The blade 32 can be made of metal, ceramic or plastic, for example.

The blade 32 is annular. The ring diameter of the annular blade corresponds approximately to the diameter of the cover to be removed or the diameter of the implant abutment. This allows a hole to be created in the gum in a predetermined shape—as with a paper punch. The blade is very sharp and can quickly cause an injury in the oral cavity if not handled properly.

Figure 2:
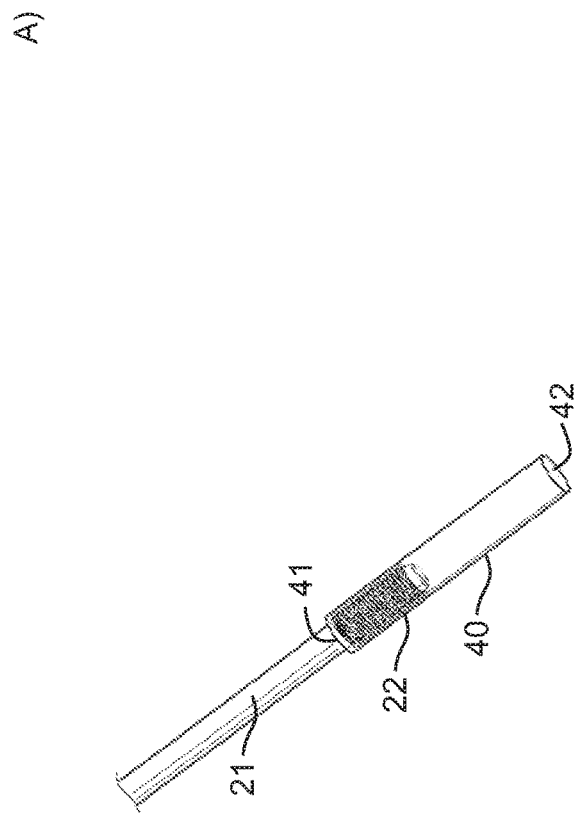
FIG. 2 a sensor holder of the device according to FIG. 1 with sensor and sterility barrier to be attached to it.

A sterility barrier 40 is arranged between the blade and the sensor. The sterility barrier 40 is or comprises in particular a bag-shaped film tube and/or a dimensionally stable sleeve with an open end 41 and a closed end 42. The sterility barrier can also form a combination of dimensionally stable sleeve at the closed end and film tube at the open end. The open end 41, in particular of a bag-shaped film tube is slipped over in particular the entire arrangement and/or over sensor 22 as shown in FIG. 2. Subsequently the dimensionally stable sleeve is flipped over the film tube and the sensor 22, as shown in FIG. 2. The closed end 42 is placed between the closed end 32 and the gingiva 82 on the one hand and the sensor 22 on the other. This prevents the film tube from wrinkling between the sensor and the gum and the risk of the blade cutting the film tube.

Alternatively, the sterility barrier 40 is designed as a film tube and is firmly connected to the cutter holder in the rear part. In the front part, the bag-shaped film tube is freely movable. This allows the film tube to be turned in during the cutting process and the sensor to spring in. At the same time, the separated gum can be accommodated in this sack-shaped bulge.

Alternatively, the sterility barrier can also be designed as a fixed protective cover around the sensor, which is guided in the cutting holder and moves back upwards together with the sensor against the cutting movement during the cutting process.

During use, the blade 32 and the sensor 22 are positioned relative to each other as follows. In a detection mode (FIG. 1A), the sensor 22 projects beyond the incisal edge 32 and can come into contact with the gum, in particular indirectly through the sterility barrier 40. Consequently, a housing 22G of the sensor 22 also represents a cutting safeguard.

The distance between the implant base body and the sensor is as small as possible in order to achieve the best possible detection result. Once the correct position has been detected, the sensor is located immediately at the position where the incision is to be made. This is communicated to the physician by outputting a signal. In particular, the signal can be acoustic so as distract the physician as little as possible; alternatively, the signal can also be output visually or haptically.

If the physician is now alerted to this by the corresponding signal, the physician initiates the transfer of the device from detection mode to cutting mode. In this case, the blade is brought into readiness to make the defined cut.

In this case, the sensor is transferred from the extended position to the retracted position as a blade securing device. Now the blade is exposed.

The blade 32 is positioned in relation to the sensor in such a way that immediately after this transfer of the sensor to the retracted position, the blade is located where the sensor is located during the extended position. The blade is thus automatically optimally positioned and the cut can be made.

In the present example, the sensor 22 is held resiliently on the base frame 11. A spring 23 presses the sensor 22 into the extended state (detection mode) by default. To transfer it to the retracted state, the physician now presses the base frame along the axis A towards the gingiva 82. Pressed by the gingiva 82 itself, the sensor is now moved into the retracted state against the spring force (cutting mode). The blade 32 now projects beyond the sensor 22, which no longer prevents contact between the gum 82 and the blade 32. The blade 32 can now cut the gum at position P1.

It is preferable to design the blade in such a way that it does not interfere with the sensor in determining the position. On the one hand, this can be achieved by selecting a suitable material, in particular ceramic or plastic. Alternatively, the influence on the sensor can be kept low by arranging the sensor as far away as possible from the blade in detection mode.

Figure 4:
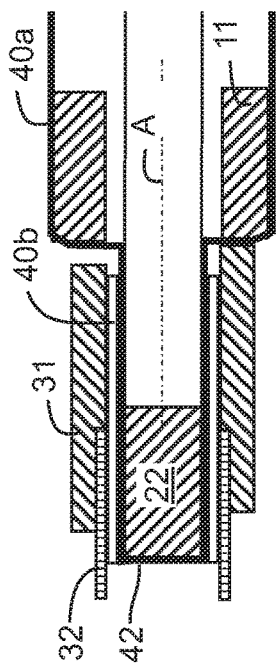
FIG. 4 a schematic enlarged view of a section of FIG. 1B.

If the sterility barrier comprises a film tube 40a, this film tube can be coaxially surrounded by a sleeve 40b (FIG. 4), in particular a dimensionally stable sleeve, in the area of the cutter and/or the cutter holder and/or the sensor. The sleeve 40b can then prevent the film tube 40a from wrinkling and can protect the film tube from damage by the cutting edge.

LIST OF REFERENCE NUMERALS 1 device
11 base frame
12 sensor guide
13 battery holder 14 switch
15 handle
21 sensor holder
22 sensor
22G sensor housing
23 spring
31 blade holder
32 blade
40 sterility barrier
41 open end
42 closed end
81 jawbone
82 gums
9 dental implant
91 implant base body
92 implant abutment
93 Implant crown
A axis
B axis of the implant base body

The invention claimed is:

1. A method comprising:

providing a device, wherein the device (1) comprises:

a sensor (22) for determining the position of the implant base body (91) covered by the gum (82), wherein the device (1) has a first blade (32) for cutting the gum (82), characterized in that the blade is annular, that the device is transferable between a detection mode and a cutting mode, that, in the detection mode, the sensor (22) is arranged on a base frame (11) in such a way as to determine the position of the implant base body (91) arranged under the gum (82), that in the detection mode, the first blade (32) is arranged on the base frame (11) in such a way that cutting of the gum (82) by the first blade (32) is prevented, and a first sterility barrier (40) is arranged between the blade (32) and the sensor (22) for the purpose of a subsequent exposure of an implant base body (91), the method further comprises the following method steps:

cutting the gum covering an implant base body with the first blade and removing the gum in the shape of a circular hole, and after cutting the gum: removing the first blade (32) and the first sterility barrier (40), providing a second blade and a second sterility barrier (40) and attaching the second sterility barrier (40) and attaching the second blade to the base frame (11), wherein the second sterility barrier (40) is located between the sensor (22) and the second blade (32).

2. A device (1) for non-invasive localization of an implant base body (2) and removal of gingiva covering the base body directly after the implant base body has been localized, wherein, during removal of the gum covering the implant base body is cut to expose the implant base body and is removed in the shape of a circular hole;

the device (1) comprises:

a sensor (22) for determining the position of the implant base body (91) covered by the gum (82), wherein the device (1) has a blade (32) for cutting the gum (82), characterized in that the blade is annular, that the device is transferable between a detection mode and a cutting mode, that, in the detection mode, the sensor (22) is arranged on a base frame (11) in such a way as to determine the position of the implant base frame (91) arranged under the gum (82), wherein the base frame (11) includes a handle (15) for being held and guided thereby by an attending physician, that the blade is fixed immovably to the base frame during use, while the sensor, is mounted movably on the base frame for transfer from detection mode to cutting mode, that in the detection mode, the blade (32) is arranged on the base frame (11) in such a way that cutting of the gum (82) by the blade (32) is prevented, and wherein the blade (32) and the sensor (22) are aligned centered to a common axis (A), wherein the sensor (22) is movable along the axis (A) for transfer from the detection mode to the cutting mode, wherein the sensor is adapted to be transferred into the cutting mode, by the physician pressing the base frame along the axis towards the gingiva thereby at the same time the blade cutting the gum.

* * * * *